(12) United States Patent
Zhang et al.

(10) Patent No.: US 11,349,852 B2
(45) Date of Patent: May 31, 2022

(54) APPARATUS AND METHODS FOR NETWORK-BASED LINE-RATE DETECTION OF UNKNOWN MALWARE

(71) Applicant: Wedge Networks Inc., Calgary (CA)

(72) Inventors: Hongwen Zhang, Calgary (CA); Mark Koob, Calgary (CA); Kevin Chmilar, Calgary (CA); Husam Kinawi, Calgary (CA)

(73) Assignee: Wedge Networks Inc., Calgary (CA)

( * ) Notice: Subject to any disclaimer, the term of this patent is extended or adjusted under 35 U.S.C. 154(b) by 282 days.

(21) Appl. No.: 16/329,514

(22) PCT Filed: Aug. 30, 2017

(86) PCT No.: PCT/CA2017/051020
§ 371 (c)(1),
(2) Date: Feb. 28, 2019

(87) PCT Pub. No.: WO2018/039792
PCT Pub. Date: Mar. 8, 2018

(65) Prior Publication Data
US 2019/0199740 A1    Jun. 27, 2019

Related U.S. Application Data

(60) Provisional application No. 62/381,930, filed on Aug. 31, 2016.

(51) Int. Cl.
*H04L 9/32* (2006.01)
*H04L 9/40* (2022.01)
(Continued)

(52) U.S. Cl.
CPC .......... *H04L 63/1416* (2013.01); *G06F 21/53* (2013.01); *G06F 21/552* (2013.01);
(Continued)

(58) Field of Classification Search
CPC .......... G06F 21/50; G06F 21/52; G06F 21/53; G06F 21/55; G06F 21/56; G06F 21/564;
(Continued)

(56) References Cited

U.S. PATENT DOCUMENTS

| 7,630,379 | B2 | 12/2009 | Morishita et al. |
| 7,854,007 | B2 | 12/2010 | Sprosts et al. |

(Continued)

FOREIGN PATENT DOCUMENTS

| CA | 2814847 A1 | 3/2006 |
| CA | 2835954 A1 | 11/2012 |

(Continued)

OTHER PUBLICATIONS

C. J. Fung; et al. "RevMatch: An efficient and Robust Decision Model for Collaborative Malware Detection", IEEE Network Operations and Management Symposium (NOMS), 2014 , pp. 1-9, Krakow, Poland. 9 Pages.

*Primary Examiner* — Khang Do
(74) *Attorney, Agent, or Firm* — Whitmyer IP Group LLC

(57) ABSTRACT

A network-based line-rate method and apparatus for detecting and managing potential malware utilizing a black list of possible malware to scan content and detect potential malware content based upon characteristics that match the preliminary signature. The undetected content is then subjected to an inference-based processes and methods to determine whether the undetected content is safe for release. Typical to inference-based processes and method, the verdict is a numerical value within a predetermined range, out of which content is not safe. The network content released if the verdict is within safe range, otherwise, the apparatus provides various options of handling such presumably (Continued)

unsafe content; options including, soliciting user input whether to release, block, or subject the content to further offline behavioral analysis.

14 Claims, 13 Drawing Sheets

(51) Int. Cl.
*H04L 12/22* (2006.01)
*G06F 21/55* (2013.01)
*G06F 21/56* (2013.01)
*G06F 21/53* (2013.01)

(52) U.S. Cl.
CPC .......... *G06F 21/564* (2013.01); *H04L 9/3247* (2013.01); *H04L 12/22* (2013.01); *H04L 63/145* (2013.01); *H04L 63/1425* (2013.01)

(58) Field of Classification Search
CPC ... G06F 21/566; H04L 63/14; H04L 63/1408; H04L 63/1416; H04L 63/145
See application file for complete search history.

(56) References Cited

U.S. PATENT DOCUMENTS

| | | | |
|---|---|---|---|
| 8,214,904 B1* | 7/2012 | Doukhvalov | H04L 63/1433 726/24 |
| 8,312,537 B1* | 11/2012 | Nachenberg | G06F 21/564 726/22 |
| 8,381,299 B2* | 2/2013 | Stolfo | G06F 21/564 726/24 |
| 8,516,586 B1 | 8/2013 | Jensen et al. | |
| 8,584,233 B1* | 11/2013 | Yang | G06F 21/56 726/22 |
| 8,789,174 B1* | 7/2014 | Gupta | G06F 21/552 726/22 |
| 8,789,186 B2 | 7/2014 | DiMuro | |
| 8,850,571 B2 | 9/2014 | Staniford et al. | |
| 8,856,933 B2 | 10/2014 | Fanton et al. | |
| 8,904,520 B1* | 12/2014 | Nachenberg | G06F 21/564 726/22 |
| 8,935,779 B2 | 1/2015 | Manni et al. | |
| 9,088,598 B1* | 7/2015 | Zhang | H04L 63/1408 |
| 9,106,694 B2 | 8/2015 | Aziz et al. | |
| 9,208,335 B2 | 12/2015 | Wu et al. | |
| 9,210,182 B2 | 12/2015 | Wright | |
| 9,245,120 B2 | 1/2016 | Friedrichs et al. | |
| 9,268,946 B2 | 2/2016 | Bettini et al. | |
| 9,330,264 B1* | 5/2016 | Hutton | H04L 63/1416 |
| 9,373,080 B1* | 6/2016 | Satish | G06Q 10/04 |
| 9,430,646 B1* | 8/2016 | Mushtaq | H04L 63/1425 |
| 9,479,357 B1* | 10/2016 | Fu | H04L 51/12 |
| 9,665,713 B2* | 5/2017 | Avasarala | G06F 21/56 |
| 9,705,904 B1* | 7/2017 | Davis | G06N 3/0454 |
| 9,716,617 B1* | 7/2017 | Ahuja | H04L 41/08 |
| 9,773,112 B1* | 9/2017 | Rathor | G06F 21/566 |
| 9,824,216 B1* | 11/2017 | Khalid | G06F 21/577 |
| 10,055,586 B1* | 8/2018 | Roundy | H04L 63/1441 |
| 10,148,673 B1* | 12/2018 | Duchin | H04L 63/1416 |
| 10,193,902 B1* | 1/2019 | Caspi | G06N 3/08 |
| 10,581,874 B1* | 3/2020 | Khalid | G06F 21/562 |
| 10,893,059 B1* | 1/2021 | Aziz | H04W 12/128 |
| 2003/0065926 A1* | 4/2003 | Schultz | H04L 63/145 713/188 |
| 2004/0093513 A1* | 5/2004 | Cantrell | H04L 63/0263 726/23 |
| 2005/0172300 A1 | 8/2005 | Snover et al. | |
| 2006/0259967 A1* | 11/2006 | Thomas | H04L 63/145 726/22 |
| 2007/0160062 A1* | 7/2007 | Morishita | H04L 63/1416 370/395.31 |
| 2008/0184371 A1* | 7/2008 | Moskovitch | G06F 21/566 726/24 |
| 2010/0125900 A1* | 5/2010 | Dennerline | H04L 63/1416 726/13 |
| 2010/0146615 A1 | 6/2010 | Locasto et al. | |
| 2011/0219449 A1 | 9/2011 | St. Neitzel et al. | |
| 2011/0231924 A1* | 9/2011 | Devdhar | H04L 63/1416 726/11 |
| 2012/0311708 A1* | 12/2012 | Agarwal | G06F 21/566 726/24 |
| 2013/0031600 A1* | 1/2013 | Luna | G06F 21/56 726/1 |
| 2013/0036469 A1* | 2/2013 | Worth | H04L 63/1408 726/23 |
| 2013/0091579 A1* | 4/2013 | White | H01R 13/6633 726/25 |
| 2013/0097706 A1 | 4/2013 | Titonis et al. | |
| 2013/0117848 A1* | 5/2013 | Golshan | G06F 21/552 726/23 |
| 2014/0181975 A1* | 6/2014 | Spernow | G06F 21/562 726/23 |
| 2014/0215621 A1* | 7/2014 | Xaypanya | H04L 63/145 726/23 |
| 2014/0279762 A1* | 9/2014 | Xaypanya | H04L 63/145 706/12 |
| 2014/0289853 A1 | 9/2014 | Teddy et al. | |
| 2015/0007312 A1* | 1/2015 | Pidathala | H04L 63/145 726/22 |
| 2015/0067857 A1 | 3/2015 | Symons et al. | |
| 2015/0096022 A1* | 4/2015 | Vincent | G06F 21/562 726/23 |
| 2015/0096024 A1* | 4/2015 | Haq | G06F 21/552 726/23 |
| 2015/0143504 A1* | 5/2015 | Desai | H04L 67/02 726/13 |
| 2015/0215285 A1* | 7/2015 | Fleury | H04L 67/10 726/13 |
| 2015/0220735 A1* | 8/2015 | Paithane | G06F 21/53 726/23 |
| 2015/0227741 A1 | 8/2015 | Permeh et al. | |
| 2015/0254555 A1* | 9/2015 | Williams, Jr. | G06N 3/0454 706/14 |
| 2016/0021142 A1* | 1/2016 | Gafni | H04L 63/1466 726/23 |
| 2016/0036816 A1* | 2/2016 | Srinivasan | H04L 61/1511 726/1 |
| 2016/0044054 A1* | 2/2016 | Stiansen | H04L 63/1416 726/24 |
| 2016/0072832 A1* | 3/2016 | Kim | G06F 11/0784 726/23 |
| 2016/0094574 A1* | 3/2016 | Hsueh | G06N 7/005 726/23 |
| 2016/0196431 A1 | 7/2016 | Lu | |
| 2016/0203318 A1* | 7/2016 | Avasarala | G06F 21/56 726/23 |
| 2016/0277423 A1* | 9/2016 | Apostolescu | G06F 21/566 |
| 2016/0328742 A1* | 11/2016 | Shiravi Khozani | G06F 21/53 |
| 2016/0330219 A1* | 11/2016 | Hasan | G06N 5/025 |
| 2016/0352772 A1* | 12/2016 | O'Connor | H04L 63/1483 |
| 2016/0366161 A1* | 12/2016 | Mehta | H04L 63/1416 |
| 2016/0379136 A1* | 12/2016 | Chen | G06F 21/552 706/12 |
| 2016/0380868 A1* | 12/2016 | Hollis | H04L 43/062 370/252 |
| 2017/0006054 A1* | 1/2017 | Stiansen | H04L 63/1425 |
| 2017/0063893 A1* | 3/2017 | Franc | H04L 63/0281 |
| 2017/0171226 A1* | 6/2017 | Watkins | H04L 63/1416 |
| 2017/0171234 A1* | 6/2017 | Christian | H04L 63/1425 |
| 2017/0223029 A1* | 8/2017 | Sharma | H04L 63/1425 |
| 2017/0250954 A1* | 8/2017 | Jain | H04L 63/1416 |
| 2017/0250997 A1* | 8/2017 | Rostamabadi | H04L 63/1425 |
| 2017/0251003 A1* | 8/2017 | Rostami-Hesarsorkh | H04L 63/1425 |
| 2017/0262633 A1* | 9/2017 | Miserendino | G06N 5/025 |
| 2017/0279773 A1* | 9/2017 | Koripella | H04L 63/1408 |
| 2017/0337372 A1* | 11/2017 | Zhang | G06F 21/53 |
| 2017/0337376 A1* | 11/2017 | Reader | G06F 21/567 |
| 2017/0357818 A1* | 12/2017 | Sheehan | G06F 21/6218 |
| 2017/0366562 A1* | 12/2017 | Zhang | H04L 63/1433 |

(56) References Cited

U.S. PATENT DOCUMENTS

2018/0018459 A1* 1/2018 Zhang .................... G06F 21/554
2018/0054449 A1* 2/2018 Nandha Premnath .. G06F 21/56
2018/0332056 A1* 11/2018 Manadhata ......... H04L 61/1511

FOREIGN PATENT DOCUMENTS

WO  2007131105 A2  11/2007
WO  2013053407 A1  4/2013

\* cited by examiner

Figure 6

| Message Digest 20 | Inspection State 43 | Inspection Result 14 | Inspection Time 44 | Content Size 45 | etc |

Content Inspection History Record 42

APPARATUS AND METHODS FOR NETWORK-BASED LINE-RATE DETECTION OF UNKNOWN MALWARE

CROSS-REFERENCE TO RELATED APPLICATIONS

This application is the National Stage of International Application No. PCT/CA2017/051020, filed Aug. 30, 2017, which claims priority from U.S. Provisional Application Ser. No. 62/381,930, filed Aug. 31, 2016, the entire disclosures of which are incorporated herein by reference in their entirety.

FIELD OF THE INVENTION

The invention relates to network based content inspection (NBCI). More specifically, the invention provides apparatus and methods for NBCI's line-rate detection of malicious software, documents or websites, collectively known as malware.

BACKGROUND

Computer programs dedicated to malware scanning employ various methods of detecting malware in network content. Such methods include behavior-based sandboxing techniques and content-based signature scanning techniques.

Behavior-based methods may involve allowing network content to execute in an isolated virtual environment, identifying malicious behavior within such environment, and if identified as malware blocking the transmission and further propagation of the offending network content.

In content-based methods, the suspected network content is commonly compared to a database of known malware-identifying signatures. If a known malware signature is found in the suspected network content, the network content is tagged as malicious and blocked.

The industry is now witnessing the resurgence of custom or zero-day malware—malware that targets a vulnerability that is not publicly known, and for which a signature has not yet been developed. Because no signature exists for zero-day malware, it cannot be reliably detected by traditional content-based, signature-based detection techniques. On the other hand, behavioral-based analysis can reveal the malicious nature of zero custom or day malware with thorough sandboxing—an approach through which the inspected network is executed in an isolated virtual environment; however, the limitation being that such sandboxing analysis is typically not possible at network-line rates.

Other inference-based heuristics analysis technique which uses machine learning schemes—be it through Bayesian weighing, neural networks or deductive reasoning—can reliably map the content's safety to a numerical verdict; out of which range, content is declared not to be safe. Though inference-based techniques could be made to compute within a bounded time though to varying degrees of accuracy, such techniques are considered be less accurate than behavioral techniques given the computational accuracy and certainty of the latter.

Systems and methods for network based content inspection are disclosed in U.S. Pat. No. 7,630,379, which is incorporated herein by reference in its entirety.

With the rapid growth of network bandwidth, from 100 Mbits/s, to 1 Gbits/s, and to 10 Gbits/s and beyond, the importance of NBCI performance is increasingly becoming paramount in the effective management of large, complex networks. As a result, there continues to be a need for NBCI methods that effectively and efficiently process data payloads in order to improve the efficiency, stability while reducing NBCI costs without compromising network speeds.

SUMMARY

In accordance with the present disclosure, there is provided an apparatus for network-based, malware analysis comprising:
a signature scanner configured to scan incoming network-based content with signature-based scanning to identify known threat content;
an AI scanner configured to:
assign a risk value, using an AI scan, to the network content which has not been identified as a known threat in the signature-based scanning step;
identify content having been assigned a risk score below a safe threshold value as safe content; and
identify content having been assigned a risk score above a threat threshold as threat content; and
a controller configured, based on the scans:
to allow safe content; and
to block threat content.

The network-based content may comprise MIME objects.

The network-based content may comprise one or more attachments.

The AI scanner may be configured to scan the content in parallel.

The signature scanner may be configured to scan the content in parallel. For example, the tasks of scanning the content may be divided up across a number of processors. For example, the division may be based on one or more of: content and scanning tasks. For example, one processor may be dedicated to scanning for a particular one or more signature whereas another processor may be dedicated to another subset of the signatures. Another option is that one portion of the content (e.g. one attachment) is sent to one processor for scanning, whereas another portion (e.g. a second attachment) is sent to another processor for scanning.

The safe threshold may be equal to the threat threshold.

The threat threshold may be higher than the threat threshold, and the AI scanner may be configured to:
identify suspicious content, suspicious content having been assigned a risk score below the threat threshold and above the safe threshold.

The controller may be configured to notify the user of identified suspicious content; and prompt the user for input regarding how to process the identified suspicious content. For example, the controller may be configured to remember the user's selection when presented with suspicious content previously.

The controller may be configured to: receive information from other users of the system regarding how to process suspicious content; and provide this information to the user to allow the user to base their input on information received from other users. This may allow the "user" input to be remembered or received from other users such that, in the absence of a sandbox, the input of other users can guide the user's decision. This may be considered to be a 'crowd-guided' learning/verdict.

The controller may be configured to notify the user if the user's input is inconsistent with the crowd-guided learning, and/or prompt the user again for input (e.g. confirming or cancelling their original selection).

For example, the system may say:
"User, we could not conclusively classify this content as clean. However, 59% of users found this to be malware, do you still want to view the file?"

The apparatus may comprise a behavioural scanner, and the apparatus is configured to run suspicious content in a isolated virtual environment to determine whether the suspicious content can be allowed to run or blocked.

The content may be processed through the malware analysis at rates of at least 1 Gbps, or at least 10 Gbps.

The apparatus may be configured to identify different types of malware identified as threat content. For example, the apparatus may be configured to identify particular instances of threat content spam, spyware or a virus.

The apparatus may use signature and AI scanning in an in-line mode. In-line mode In-line mode may be considered to place a scanner directly in the network traffic path, inspecting all traffic at wire speed as it passes through the scanner. In-line mode may enable the scanner to be run in a protection/prevention mode, where packet inspection is performed in real time, and intrusive packets can be dealt with immediately; For example, malicious or threat packets can be dropped immediately. This may enable the prevention of an attack from reaching its target.

In contrast, tap mode works through installation of an external wire tap or built-in internal taps. A scanner deployed in tap mode monitors the packet information as it traverses the network segment. A downside of tapped mode is that, unlike in-line mode, you cannot prevent attacks. Tap mode is typically passive; the scanner essentially sees malicious traffic as it passes. It generally is difficult to inject response packets back through a tap, so discovering an attack in tap mode triggers a response post-attack.

The scanner may be configured to inspect the data payload (content) to determine if the content of this payload has been inspected previously or is currently under inspection. If the scanner recognizes that the content of the payload has been previously inspected, the scanner will deliver the recognized payload (together with an inspection result as explained below) without subjecting the payload to content inspection. If the scanner determines the payload is an unrecognized payload (that is, the payload has not been inspected previously), the unrecognized payload is delivered for scanning. The scanner calculates the inspection result and delivers the inspected payload together with the inspection result. If the scanner recognizes that the payload 14 is under inspection, the scanner will delay processing of other payloads containing the same content.

The apparatus may comprise a policy module configured to apply a set of operations, such as the downstream delivery of the recognized payload, or modify the payload, based on business specific policies. An inspected payload and inspection result is returned to the apparatus in order that subsequent receipt of a similar payload does not pass through the scanner. Generally, an inspection result may include one or more markers that indicate that the content has been inspected and/or classified, and that enable other functions to be performed on the payload according to pre-determined policies.

Other embodiments may be configured to allow partial recognition of the payload content in order that content inspection is only needed for the portion of the payload content that has not been previously inspected.

For example, the payload may be decomposed into logical portions and each portion is evaluated to determine if it has been inspected. If the algorithm determines that there are un-inspected portions a message digest is calculated for the un-inspected portions. Each message digest may then be scanned by the scanner as described above.

Decomposition may be achieved by breaking down a payload into logical portions such as by attachment within an email, or the file content within a zip file.

The apparatus (e.g. the AI and/or signature scanners) may be configured to schedule the content inspection of multiple inspection tasks in order to prevent system resource exhaustion in the event of the rapid or simultaneous arrival of many different data payloads, many instances of the same content, or in the event of a deny-of-service attack. Such scheduling will ensure that the system resources are efficiently utilized to complete content inspection and are spent on applying the content inspection algorithms to one only instance of any multiple instances. This is achieved by giving much lower priority to time-consuming or system resource demanding content processing tasks. Scheduling is accomplished by utilizing the content inspection state (i.e. un-inspected, under-inspection or inspected) together with information relating to the number of required inspection tasks, the time of receipt of an inspection task and the size of the inspection task.

For example, in a situation where there are 100 users accessing a network, and 99 of those users are attempting to pass small payloads (e.g. a 1-2 kb file) through the network and 1 user is attempting to pass a larger file (e.g. a 100 Mb file) through the network, the scheduling manager will assign priority and allocate system resources based on both the size of each inspection task and the time taken to complete each content inspection task in order to minimize or prevent system resources being consumed by the single, larger inspection task, thus preventing each of the multiple users passing smaller payloads having to wait for the completion of the single larger inspection. That is, the system is able to prevent "live-lock" of the system resources by lengthy content inspection tasks.

In accordance with the present disclosure, there is also provided a method for network-based, malware analysis comprising:

scanning incoming network-based content with signature-based scanning to identify known threat content;

assigning a risk value, using AI scanning, to the network content which has not been identified as a known threat in the signature-based scanning step;

identifying content having been assigned a risk score below a safe threshold value as safe content; and identifying content having been assigned a risk score above a threat threshold as threat content; and allowing safe content; and blocking threat content.

In accordance with the present disclosure, there is also provided a computer program configured to, when run on a computer to:

enable scanning incoming network-based content with signature-based scanning to identify known threat content;

enable assigning a risk value, using AI scanning, to the network content which has not been identified as a known threat in the signature-based scanning step;

enable identifying content having been assigned a risk score below a safe threshold value as safe content; and enable identifying content having been assigned a risk score above a threat threshold as threat content; and enable allowing safe content; and enable blocking threat content.

Malware may be considered to be software configured to disrupt computer operation, gather sensitive information, or gain unauthorized access to computer systems. Malware may comprise one or more of: viruses, worms, spyware and Trojan horses.

Machine Learning is a type of artificial intelligence (AI) which may be used in conjunction with embodiments of the present disclosure. Machine learning may allow a computer (or computer program) to learn and adapt when exposed to data. For example, an apparatus using machine learning may be configured to determine characteristics which are common so some malware which distinguish them from safe content. Machine learning may comprise using pattern recognition and/or computational learning theory in AI. Machine learning may use heuristic techniques.

A controller or a scanning module (e.g. the signature, AI or behavioural scanner) may comprise a processor and memory. The memory may store computer program code. The processor may comprise, for example, a central processing unit, a microprocessor, an application-specific integrated circuit or ASIC or a multicore processor. The memory may comprise, for example, flash memory, a hard-drive, volatile memory. The computer program may be stored on a non-transitory medium such as a CD.

A behavioural scanner may comprise a virtual computer sandbox for running or opening the code in isolation.

The apparatus may comprise an Internet security-centric machine configured to learn and adapt algorithms to uncover new and unknown threats so as to learn from and make predictions on data. This may help protecting our systems from malicious entities.

The AI and/or signature scanners may be configured to reduce the computation required to perform content inspection on concurrently received network data packet payloads (or other network content) are described. In the context of this description "concurrently" means content items (e.g. data payloads) received by a computer network within a short time period such that the system resources considers the content items to have been effectively received at the same time or within a short time period.

The method may include:
subjecting a data payload that may be carried via a variety of communication protocols to a content recognition module for determining if the payload or a component thereof has been previously inspected, or is being inspected; and
a) if the content has been previously inspected, associate this payload with a previous inspection result for policy enforcement without inspecting this payload;
b) if a previous instance of the content is being inspected, in order to preserve the NBCI system resources, the inspection of the instance will wait until the inspection of the being inspected instance is completed;
once inspection is completed, delivering the payload and inspection result.

The method may include subjecting an unrecognized payload to content inspection to produce an inspection result and subsequently storing the inspection result in a content recognition module.

For a given content inspection task, the NBCI system resource allocation priority may be adjusted with the passage of time so that other communication sessions can have a share of system resources.

The method may allow several NBCI systems in a network to learn from each other's content inspection results.

The method may provide further functionality including any operative combination of various functions as described below.

The content recognition module may include a one-way hash function for calculating a message digest of the data payload and wherein the message digest is compared to previously stored message digests from previously inspected data payloads. Message digests from previously inspected data payloads are stored in a look-up table and the content recognition module returns a previously inspected result if the message digest of the data payload is the same as a previously stored message digest. As well, the content recognition module returns a null result if the message digest of the data payload does not correspond to a previously stored message digest. This payload is then subjected to content inspection and is further subjected to a one-way hash function to calculate a message digest of the unrecognized result and the message digest subsequently stored in the content inspection module.

The knowledge of what content has been inspected or what content is under inspection may be stored in a Content Inspection History Lookup (CIHL) table as a record. Each record, hereafter referred to as CIH record, in the CIHL table is indexed with a unique signature of the content. This signature is in the form of a message digest such as those created with SHA-1, MD-5, etc. Each entry also contains a field to indicate if the content is currently under inspection.

The CIHL table may also contain a field for the inspection result which may be instructions to take subsequent action with respect to the data payload. Additional information may be added as fields to a CIH record. In one embodiment, this additional information may be time of inspection that may be part of a system to enhance security such that a data payload is no longer marked as inspected if the time of creation information exceeds a pre-determined value. Other information may include size information.

The apparatus and method may enable many copies of data payloads of the same content entering a network via a variety of communication sessions and via different communication protocols to be effectively and efficiently inspected.

The system and methods may associate a message digest with supplementary information such as time stamp, payload size, etc., to minimize the risk of message digest collision-based attacks against a NBCI system.

The payload or content may be data of an application level network protocol and the payload may be decomposed prior to content inspection.

The apparatus may comprise a system implemented on a computer or a network of computers for enhancing network based content inspection of a number of concurrently received data payloads.

The apparatus may be comprise:
a content recognition module for recognizing if each data payload has been previously inspected for content or is currently under inspection and a) allowing a recognized data payload to be delivered without content inspection; and b) subjecting an unrecognized data payload to content inspection to produce a content inspection result and subsequently storing the content inspection result in the content recognition module.

Inspections of multiple data payloads may be scheduled by a content inspection scheduler that assigns and modifies the system resource allocation priority to an inspection task.

The content inspection module may be a co-processor and/or the content inspection module utilizes CAM (Content-Addressable Memory).

The system may include at least two content inspection modules operatively connected to a common look-up table, the results of content inspection on at least two content inspection modules is added to the common look-up table and/or the content recognition look-up tables are synchronized with each other.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 6 is the structure of a content inspection history (CIH) record;

DETAILED DESCRIPTION

Introduction

Figure 1:
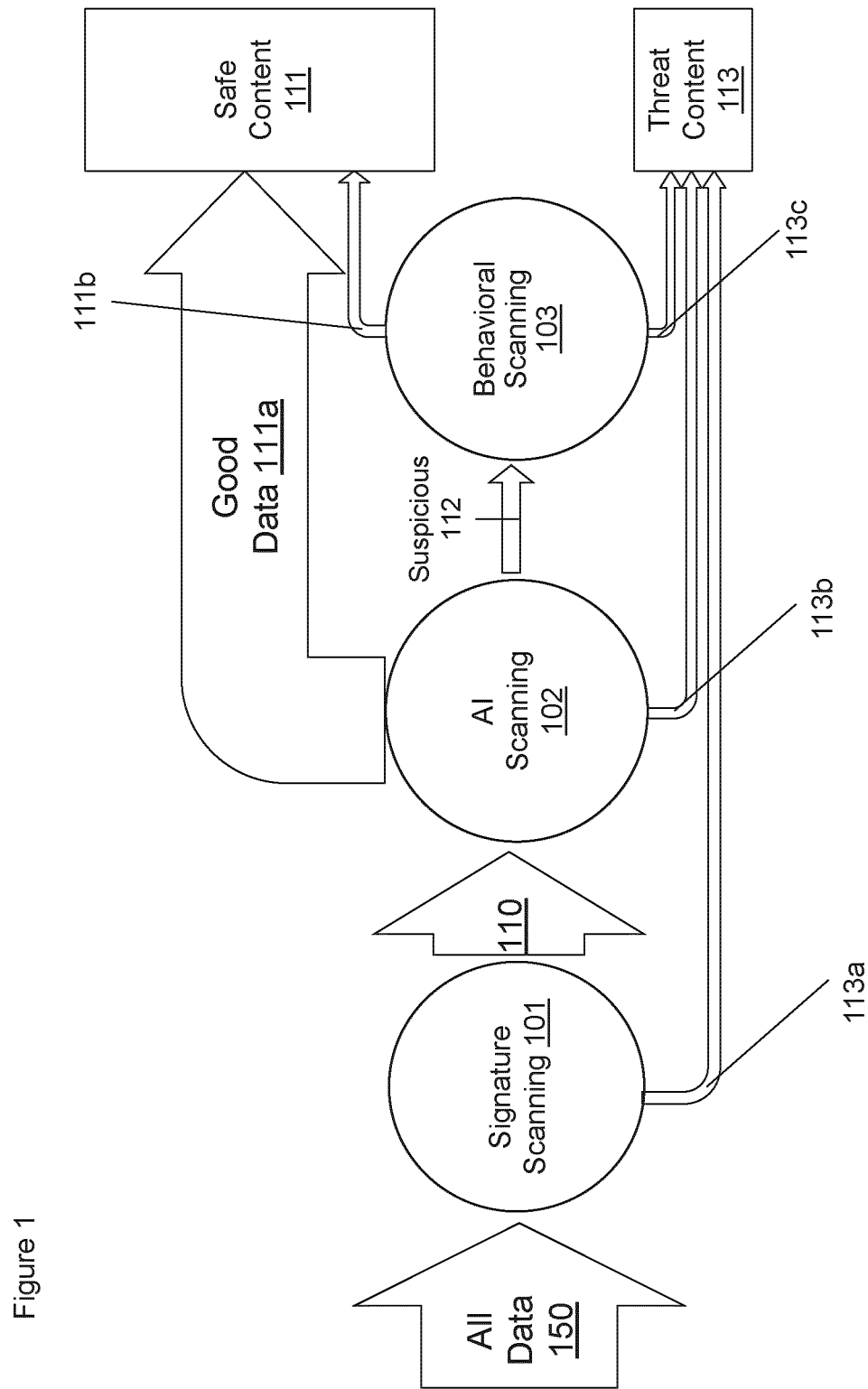
FIG. 1 is a schematic of a scanning procedure according to a first embodiment.

Various aspects of the invention will now be described with reference to the figures. A number of possible alternative features are introduced during the course of this description. It is to be understood that, according to the knowledge and judgment of persons skilled in the art, such alternative features may be substituted in various combinations to arrive at different embodiments of the present invention.

A problem with using signature-based scanning is that it requires the lengthy process of finding malware, getting a sample, analyzing it, generating a signature and adding it to the repository that is propagated to users as anti-virus updates.

Another problem is that some malware (e.g. polymorphic and metamorph malware) is able to mutate its code, making signature generation difficult. A polymorphic virus for example, may make use of a decrypter, encrypter stub, thereby making the creation of a signature more difficult because a different key is used each time the virus propagates to a different computer the body of the virus is completely different every time. Metamorphic viruses may be able to 'evolve', i.e., re-code themselves. This ability makes the creation of a signature difficult.

Machine learning techniques on the other hand, may identify (or assign a risk to) malware based on their characteristics rather than a pre-determined signature even if it hasn't been detected elsewhere or analyzed by researchers.

Once the 'intelligent' malware detection system has been trained using known malware activity the system gains the ability to detect previously unknown malware. However, using such 'intelligent' malware detection systems alone may generate an unworkable quantity of false positives, as characteristics of safe files may be incorrectly identified as corresponding to malware.

The present technology relates to a network-based line-rate method and system for detecting and managing potential malware utilizing a blacklist of possible malware to scan content and detect potential malware content based upon characteristics that match the preliminary signature. The undetected content (e.g. content which does not correspond to previously identified malware) is then subjected to an inference-based or behavioural-based processes and methods to determine whether the undetected content is safe for release. Typical to inference-based processes and method, the verdict is a numerical value within a predetermined range, out of which content is not safe. The network content released if the verdict is within safe range, otherwise, the system provides various options of handling such presumably unsafe content; options including, soliciting user input whether to release, block, or subject said content to further offline behavioral analysis.

That is, the present technology uses a multi-staged analysis which may offer better accuracy during line-rate content-based scanning. Offline behavioral analysis may be used in conjunction with the present technology. For example, after-the-fact remediation may be used if it was deduced that malware is present.

With the advent of mobile devices and cloud computing, where the accuracy of network-based solutions has to be high, embodiments use multiple scanners (e.g. arranged sequentially), in the order of signature scanning first, then the inference AI scanning techniques. In this way, a higher accuracy of detecting unknown malware may be achieved.

Overview

FIG. 1 depicts a scanning method for network-based, malware analysis. In this embodiment, incoming network-based content 150 is subjected to a multi-staged scanner. In its first stage 101, content is subjected to a content-based, signature-based analysis to determine whether the content is known to be malware. Content which corresponds to known malware based on the signature is identified as threat content 113a.

In this case, failure to be mapped to a known-malware signature results does not mean the content is not malware and hence the undetected content 110 is subjected to a second stage, the second stage comprising AI scanning 102. In other embodiments, the second stage may comprise behavioural, sandboxing analysis and/or inference-based techniques. Because of this second stage scanning—after being scanned against known malware—the processing times and accuracy of this inference-based second stage can be greatly enhanced.

In some embodiments, content that is still uncategorized after the two stages of scanning can either be blocked 113, subjected to user's input to determine whether the content be blocked, released or subjected to a full behavioral scanning.

The scanning apparatus may be configured to scan received content and/or content for transmission.

The scanning apparatus may be configured to scan content before or after a firewall. Configuring the scans to take place before the firewall helps relieve firewalls and other systems that may be fatigued.

The content identified as safe can then be delivered to, for example, applications, Operating Systems, a Network or connected infrastructure (e.g. comprising clients, servers) or used in conjunction with the Internet of Things.

The first two stages can be performed at network line rates (e.g. one or more of: up to 100 Mbits/s; between 100 Mbits/s and 1 Gbits/s; between 1 Gbits/s and 10 Gbits/s; between 10 Gbits/s and 100 Gbits/s; and over 100 Gbits/s).

To give an indication of how the present system may be used, in a US school district with 120,000 active internet users, 3.2% are attacked on average generating 3,840 events daily. Signature-based is typically able to stop 3,540 of these. Without AI scanning, the remaining 300 files were submitted to a sandbox company. Among these submitted files, only 2 (1 to 3) is APT (Advanced Persistent Threat). The Second stage is hence expected to handle around 295 of these 300. Percentage-wise, signature scanning accuracy will typically be around 92.1%, with AI this may increase to 99.8% and with Sandboxing the accuracy may approach 100%. It will be appreciated that these accuracy figures are for guidance only.

Signature scanning scans against known-malware, and hence provides as a base blacklist. AI scanning scans content, analyzing its structure looking for patterns or sequence thereof, that are common across malware. AI scanning helps protect against malware for which signatures are yet to be developed (unknown malware or custom tailored malware). Because malware is typically made of executable computer instructions, AI scanning techniques can result in false positives especially when scanning 'safe' computer instructions. AI scanning techniques may also be computationally 'expensive' compared with signature scanning.

Signature Based Scanning

The first stage of scanning in the embodiment of FIG. 1 is signature scanning 101. Signatures consist of a small sequence(s) of bytes of machine code from within the virus which can be used to recognise the virus. An effective signature may be one that is found in every object infected by the virus, but unlikely to be found in 'normal' code.

In this embodiment, the scan is performed according to the scheme outlined in Morishta et al. (U.S. Pat. No. 7,630,379). For example, the signature scanner may be configured to carry out the following steps:
  a) subjecting each newly arriving data payload to content recognition to determine if the newly arriving data payload content has been previously inspected, has not been inspected or is currently under inspection;
  b) allowing a newly arriving data payload recognized as previously inspected to be delivered without content inspection;
  c) subjecting a newly arriving data payload recognized as not been inspected to content inspection to produce a new payload inspection result whereby the newly arriving data payload becomes a newly inspected data payload;
  d) storing a message digest for the newly inspected data payload with the new payload inspection result in a content history lookup table wherein content recognition includes the steps of:
    i) subjecting each newly arriving data payload to a one way hash function to calculate a message digest of the newly arriving data payload;
    ii) comparing the message digest of the newly arriving data payload to previously stored message digests in the content history lookup table wherein each previously stored message digest has an associated inspection result; and wherein
    iii) if the message digest of the newly arriving data payload from step ii) is identical to a previously stored message digest determining:
      a. if the previously stored message digest is flagged as inspected then i. determining a policy action based on the inspection result; or
      b. if the previously stored message digest is flagged as under-inspection then i. waiting a pre-determined time period before repeating step ii).

In this way, the accuracy of the verdict can be improved by referring to verdicts of previously scanned content.

In this case, the signature scanning is configured to block known malware 113a by identifying known malware as threat content 113; to forward all other traffic 110 to the next scanner 102; and provide coverage for Legacy File Types.

AI Risk Assignment

The second scanning stage 102 in this case is an AI (Artificial Intelligence) scanning stage which is configured to identify characteristics common to malware but different from safe content.

Artificial intelligence may use algorithms to classify the behavior of a file as malicious or benign according to a series of file features that are manually extracted from the file itself. The machine may be configured by the manufacturer or user what parameters, variables or features to look at in order to make the decision. In some cases machine learning solutions are used to identify a suspicious situation, but the final decision as to what to do about it is left to a user.

Artificial Intelligence scanning may use machine learning. Once a machine learns what malicious code looks like, it may be configured to identify unknown code as malicious or benign (by assigning a risk value) and in real-time. Then a policy can be applied to delete or quarantine the file or perform some other specified action.

AI scanning may be performed in a way similar to CylancePROTECT® software (e.g. as described in US 2015/227741).

AI scanning may comprise analyzing and classifying many (e.g. thousands) characteristics per file to determine a risk value.

Analysis of a file may be based on a previous analysis of a large number (e.g. hundreds of millions) of files of specific types (executables, PDFs, Microsoft Word® documents, Java, Flash, etc.).

The goal of this pre-analysis is to ensure that:
  there is a statistically significant sample size;
  the sample files cover a wide range of possible range of file types and file authors (or author groups such as Microsoft, Adobe, etc.); and
  the sample is evenly distributed across the specific file types.

The pre-analysis involves identifying the files into three categories: known and verified valid, known and verified malicious and unknown.

The next phase in the machine learning process is the extraction of attributes which are characteristic of known malware. These attributes or characteristics can be as basic as the PE (Portable Executable) file size or the compiler used and as complex as a review of the first logic leap in the binary. The identified characteristics may be dependent on its type (.exe, .dll, .com, .pdf, .java, .doc, .xls, .ppt, etc.).

By identifying multiple characteristics may also substantially increases the difficulty for an attacker to create a piece of malware that is not detected by the AI scanner.

In this case, the AI scanner 102 is configured to analyze all Executables; provide risk scores; block threat content 113b (content with a risk value above a threat threshold); allow safe content 111a (content with a risk value below a safe threshold); identify suspicious content 112 (content with a risk value between the sage threshold and the threat threshold); and pass suspicious content 112 to the behavioural scanner.

In some cases, the behavioural scanner may be omitted. It will be appreciated that in some embodiments, the malware analysis apparatus may prompt the user to determine how to process suspicious content. For example, the apparatus may be configured to ask whether suspicious content should be allowed or blocked (e.g. prevented from running). The apparatus may be configured to remember user's choices and prompt or apply them for future identified suspicious content (e.g. based on source, risk score).

Behavioural Scanner

In this case, the embodiment comprises a behavioural scanner 103 for scanning suspicious content 112. The behavioural scanner comprises a malware sandbox. A malware sandbox is a controlled testing environment (sandbox) which is isolated from other computers in which an item of suspicious code can be executed in a controlled way to monitor and analyze its behaviour.

The malware sandbox may comprise an emulator. An emulator may be considered to be a software program that simulates the functionality of another program or a piece of hardware.

The malware sandbox may use virtualization. With virtualization, the suspicious content may be executed on the underlying hardware. The virtualization may be configured to only control and mediate the accesses of different programs to the underlying hardware. In this fashion, the sandbox may be isolated from the underlying hardware.

The behavioural scanner in this case is configured to minimize false positives from the AI-based scanner by providing a safe outlet for content identified as suspicious by the AI scanner.

The behavioural scanner is configured, based on the suspicious content's 103 behaviour to identify the content as either threat content 113c or as safe content 111b.

Content identified as safe content (e.g. by the AI or behavioural scanning) is allowed. Depending on the context, allowed may mean that the content can continue to its destination on the network, or that the content can be executed. Content identified as threat content (e.g. by the signature, AI or behavioural scanning) is blocked.

Interaction Between Stages

In embodiments described herein, because the first step is a signature-based analysis, the threshold for identifying a particular file as a risk may be higher in the AI-scanning stage. This may reduce the instances of false-positives.

Once a file is identified as being a threat in the signature-based scan, this file may be passed to the machine learning algorithm already identified as being a threat for learning (in addition to being blocked). Similarly, in embodiments with a sandbox stage, any files identified as being safe or as being a threat may be passed to the AI algorithm to allow the AI algorithm to learn from this sandbox analysis. This may allow the machine learning algorithm to refine the characteristics which it uses to identify content as a threat.

Because NBCI systems have a finite number of system resources, by filtering out known malware in a first stage, more of these resources may be dedicated to detecting unknown content using AI scanning. This may result in a more robust and stable NBCI apparatus. In addition, to maintain line rate scanning speeds, it is important that the AI scanning stage is dedicated to unknown threats. That is, because AI can be slower than signature scanning, it may be important to ensure that AI scanning is used only on content which can not be identified as a threat using the more rapid signature scanning.

Second Embodiment

Figure 2:
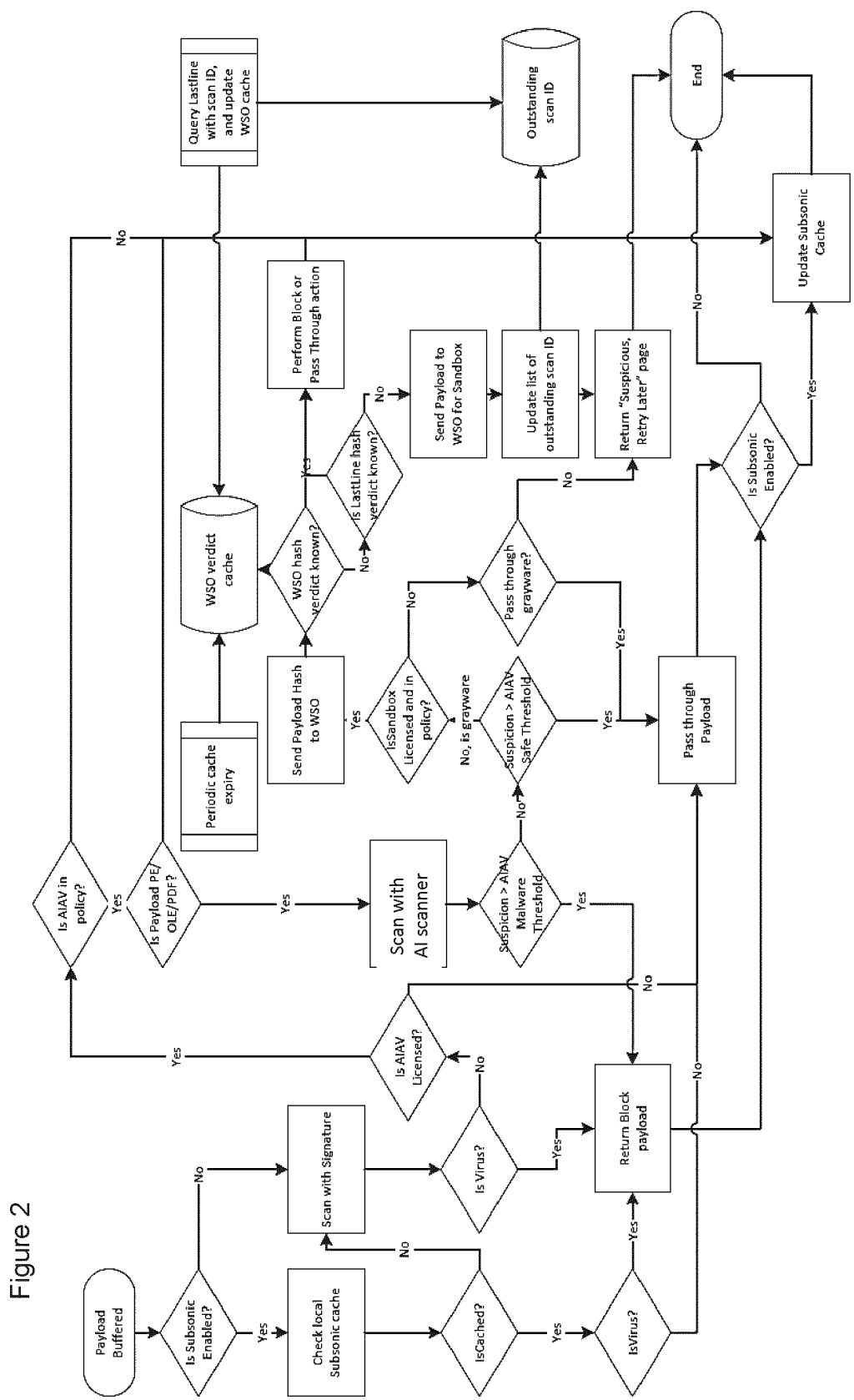
FIG. 2 is a schematic of a scanning procedure according to a second embodiment.

FIG. 2 shows an alternative embodiment showing how content may be processed in order to identify threat content and safe content.

That is, FIG. 2 provides the logic of how content flows between the scanners—the signature, the AI and the sandbox scanners.

Interaction with Network

Figure 3:
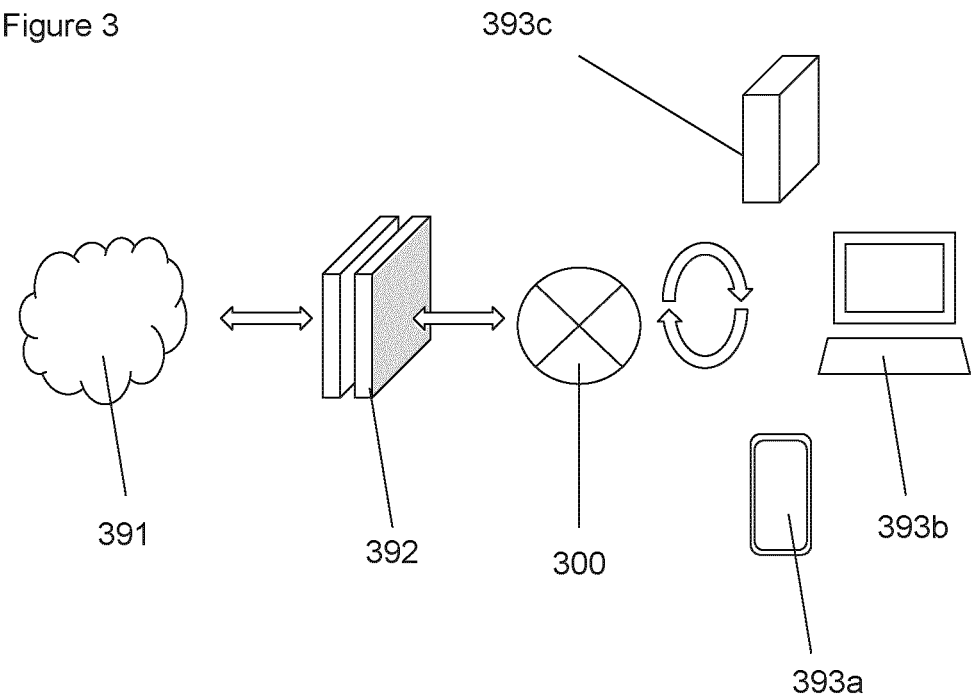
FIG. 3 is a schematic showing how the apparatus interacts with other components of a network.

FIG. 3 is a schematic showing the location of the malware analysis apparatus within the network. In this case, the network is connected an external network such as the Internet 391 or cloud via one or more servers 392. Content is transmitted to and from this external network from various sources. Dividing this portion of the network and the internal portion of the network is the malware analysis apparatus 300. The internal portion of the network may comprise one or more connected computer devices (e.g. mobile phones 393a, computers 393b, and servers 393c).

The malware analysis apparatus is configured to scan content passing between the internal and external portions of the network to filter threat content.

As noted above, the malware analysis apparatus may be configured to scan content before or after a firewall. Configuring the scans to take place before the firewall helps relieve firewalls and other systems that may be fatigued.

Controlling Computation

Regarding optimizing the computation required to perform content inspection on concurrently received network data packet payloads are described. In the context of this description "concurrently" means data payloads received by a computer network within a short time period such that the system resources considers the data payloads to have been effectively received at the same time or within a short time period.

Figure 4:
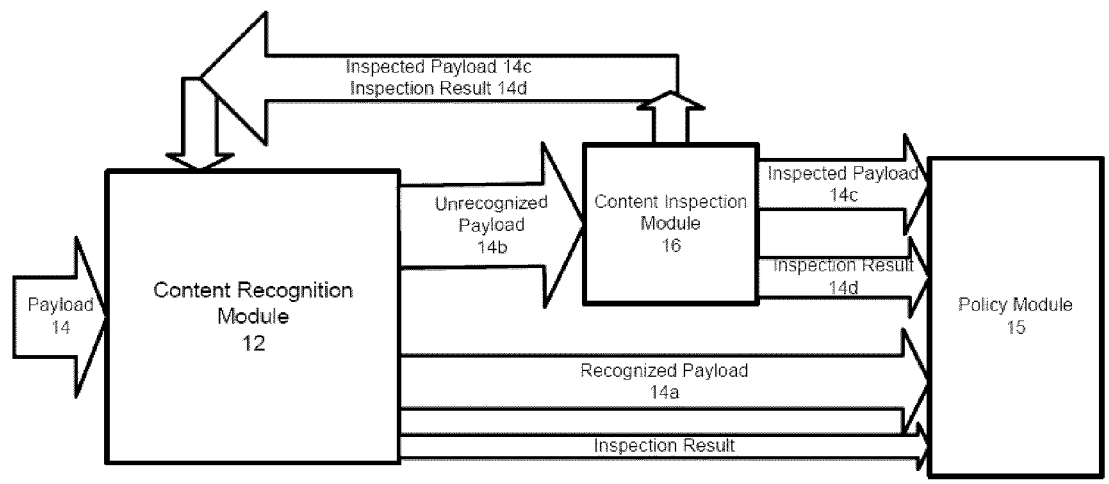
FIG. 4 is a schematic block diagram showing the interaction of a content recognition module and a content inspection module within a computer system, a co-processor, or a software module in accordance with one embodiment of the invention.
Figure 5:
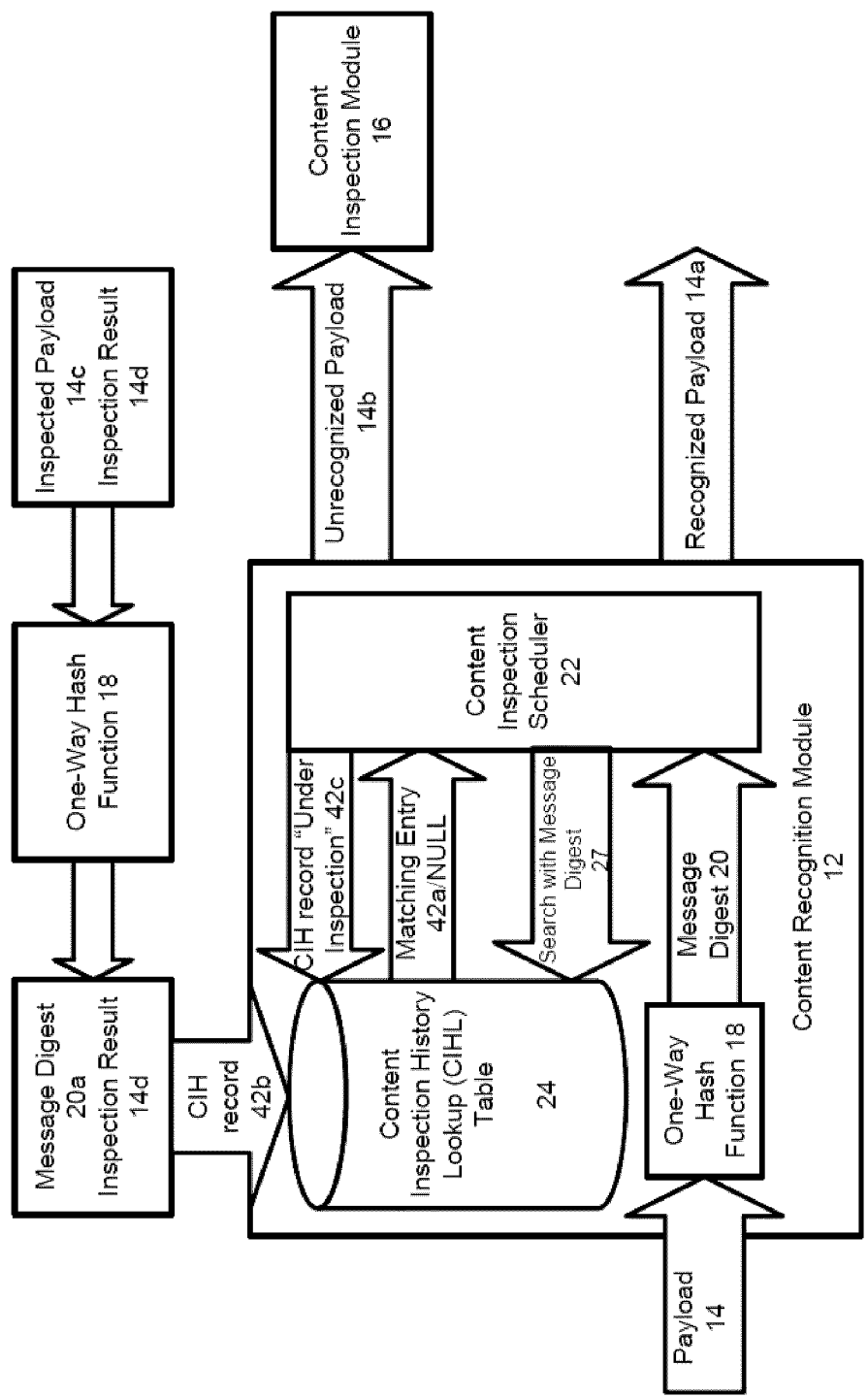
FIG. 5 is a schematic block diagram of an implementation of the content recognition module.
Figure 7:
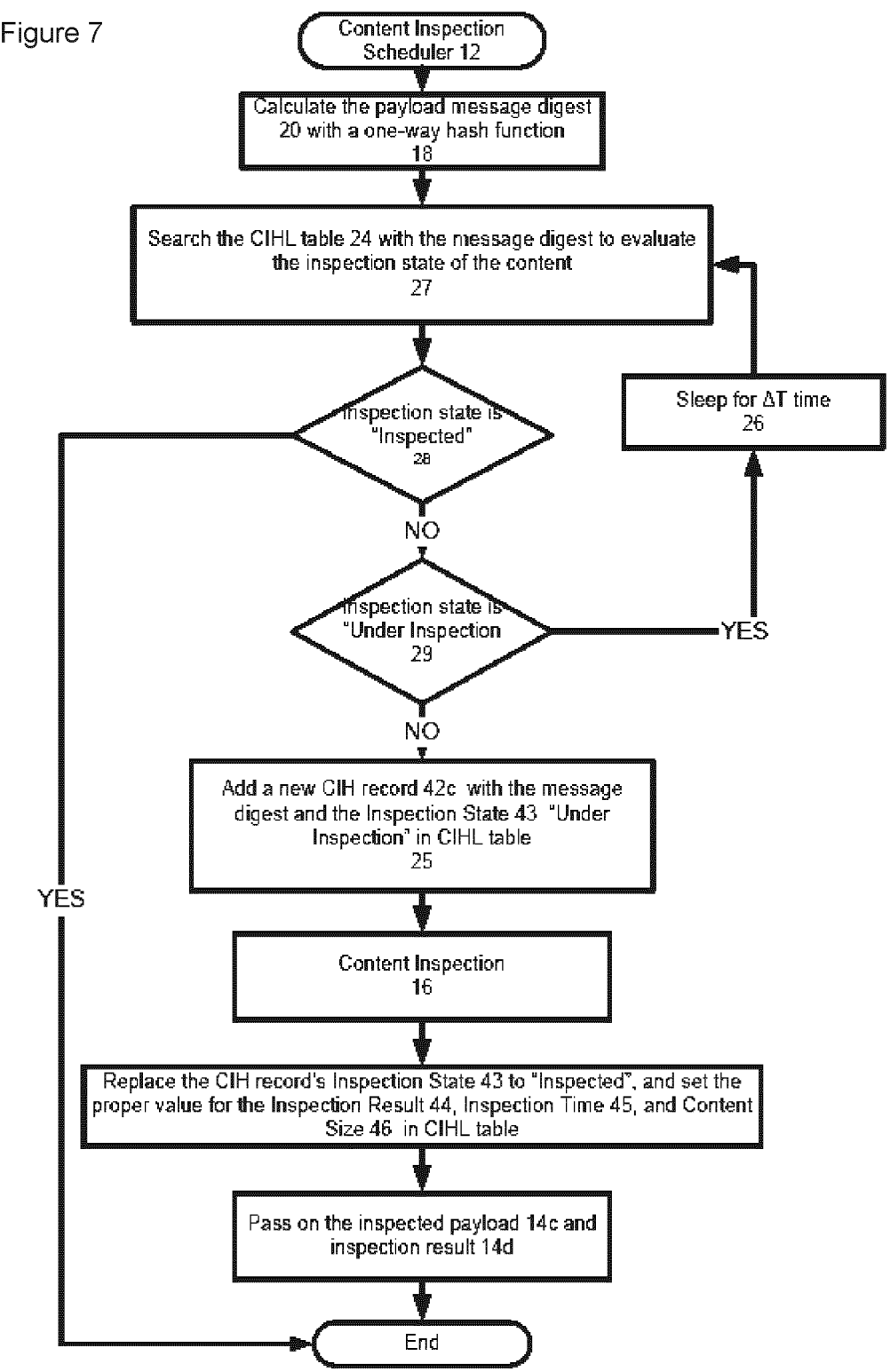
FIG. 7 is a flow diagram of a method of processing a payload in accordance with one embodiment of the invention.
Figure 8:
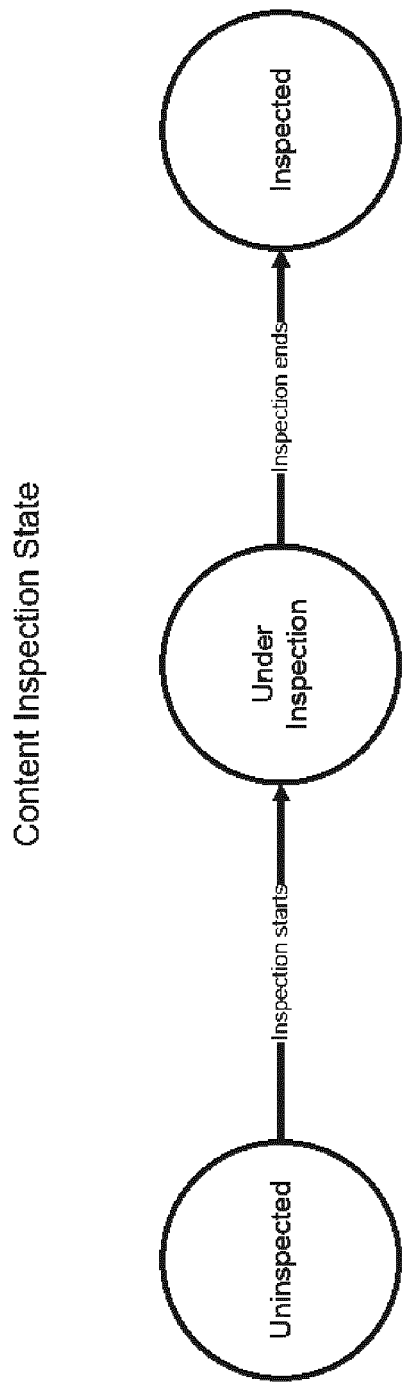
FIG. 8 illustrates the state machine of the content inspection state transition.

With reference to FIG. 4, a content recognition module (CRM) 12 receives a data payload 14. The CRM 12 inspects the data payload to determine if the content of this payload 14 has been inspected previously or is currently under inspection. If the CRM 12 recognizes that the content of the payload 14 has been previously inspected, the CRM will deliver the recognized payload 14a (together with an inspection result as explained below) without subjecting the payload to content inspection. If the CRM 12 determines the payload is an unrecognized payload (that is, the payload has not been inspected previously), the unrecognized payload 14b is delivered to a content inspection module (CIM) 16. The content inspection module 16 calculates the inspection result and delivers the inspected payload 14c together with the inspection result. If the CRM recognizes that the payload 14 is under inspection, the CRM will delay processing of other payloads containing the same content. This type of analysis may be used for signature and/or AI scanning.

In this case, a policy module 15 applies a set of operations, such as the downstream delivery of the recognized payload 14a, or modify the payload, based on e.g. business specific policies. An inspected payload 14c and inspection result 14d is returned to the CRM 12 in order that subsequent receipt of a similar payload does not pass through the content inspection module 16. Generally, an inspection result is one or more markers that indicate that the content has been inspected and/or classified, and that enable other functions to be performed on the payload according to pre-determined policies.

With reference to FIGS. 5, 6, 7 and 8, the functionality of the CRM 12 is described. Initially, the payload 14 is passed through a one-way hash function to calculate a message digest 20 of the payload. The message digest is then passed through a Content Inspection Scheduler (CIS) 22 that compares the message digest 20 with previously stored message digests within a Content Inspection History Lookup (CIHL) Table 24. Each record 42 (FIG. 6) within the CIHL Table 24 is uniquely identified with a message digest. If a null matching record is found, meaning that the digest does not correspond to a previously stored digest, the payload content 14b is passed to the content inspection module 16 for inspection by the content inspection module 16. The content is then marked as "Under Inspection" 25 (FIG. 7) by adding a CIH record 42c into the CIHL table 24. This record will have its Inspection State 43 set to the value of "Under inspection". The content inspection module 16 scans the payload for content and classifies the content based on pre-determined criteria.

After inspection, the newly inspected content 14c is passed through the one-way hash-function to calculate a message digest 20a of the newly inspected content 14c. A CIH record 42b is inserted into the CIHL Table 24. This entry has the message digest 20a, the Inspection State "Inspected", the Inspection Result 14d, and optionally other supplementary information as will be explained in greater detail below.

If the comparison returns a matching CIH record 42 with the Inspection State field 43 being "Under Inspection" (Step 29), meaning a previous payload carrying the same content is currently being inspected, the processing of the latter payload content will wait for a period of time 26 before continuing. When the system determines that the inspection state of the previous payload content (FIG. 7, step 27) has changed to "inspected", the latter payload content will be subjected to content recognition.

If the comparison (step 28) returns a matching CIH record 42 with the Inspection State field 43 being "Inspected", meaning that the digest corresponds to the message digest of previously inspected content, the payload by-passes the content inspection module 16 as recognized payload 14a.

The one-way hash function may be a known Secure Hash Algorithm (SHA), such as SHA-1, MD2, MD4, MD5, variations thereof or other hashing algorithms as known to those skilled in the art.

Figure 9:
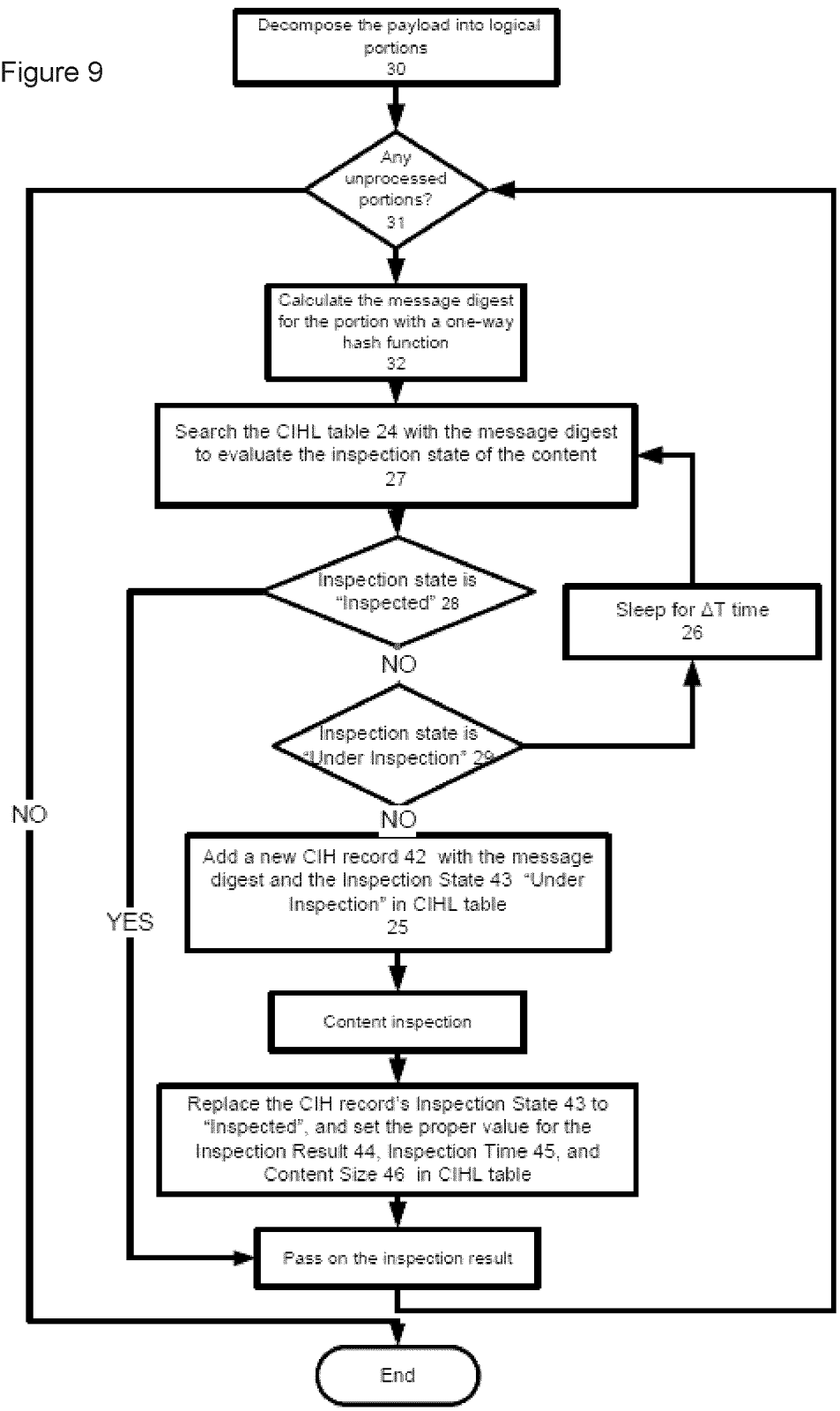
FIG. 9 is a flow diagram of a method of processing a payload including decomposition of the payload and partial recognition of the payload where content inspection is only conducted for portions not previously inspected.

With reference to FIG. 9, an alternate embodiment is described that further enhances the efficiency of content inspection. In this embodiment, a methodology allowing partial recognition of the payload content is conducted in order that content inspection is only needed for the portion of the payload content that has not been previously inspected.

In this embodiment, the payload is decomposed into logical portions 30 and each portion is evaluated to determine if it has been inspected. If the algorithm determines that there are un-inspected portions (step 31), a message digest (step 32) is calculated for the un-inspected portions. Each message digest is then searched within the CIHL table as described above.

Decomposition may be achieved by breaking down a payload into logical portions such as by attachment within an email, or the file content within a zip file.

Scheduling Manager

In a preferred embodiment, scheduling the content inspection of multiple inspection tasks is conducted to prevent system resource exhaustion in the event of the rapid or simultaneous arrival of many different data payloads, many instances of the same content, or in the event of a deny-of-service attack. Scheduling of one or more of the AI and signature scanning stages will ensure that the system resources are efficiently utilized to complete content inspection and are spent on applying the content inspection algorithms to one only instance of any multiple instances. This is achieved by giving much lower priority to time-consuming or system resource demanding content processing tasks. Scheduling is accomplished by utilizing the content inspection state (i.e. un-inspected, under-inspection or inspected) together with information relating to the number of required inspection tasks, the time of receipt of an inspection task and the size of the inspection task.

Figure 10:
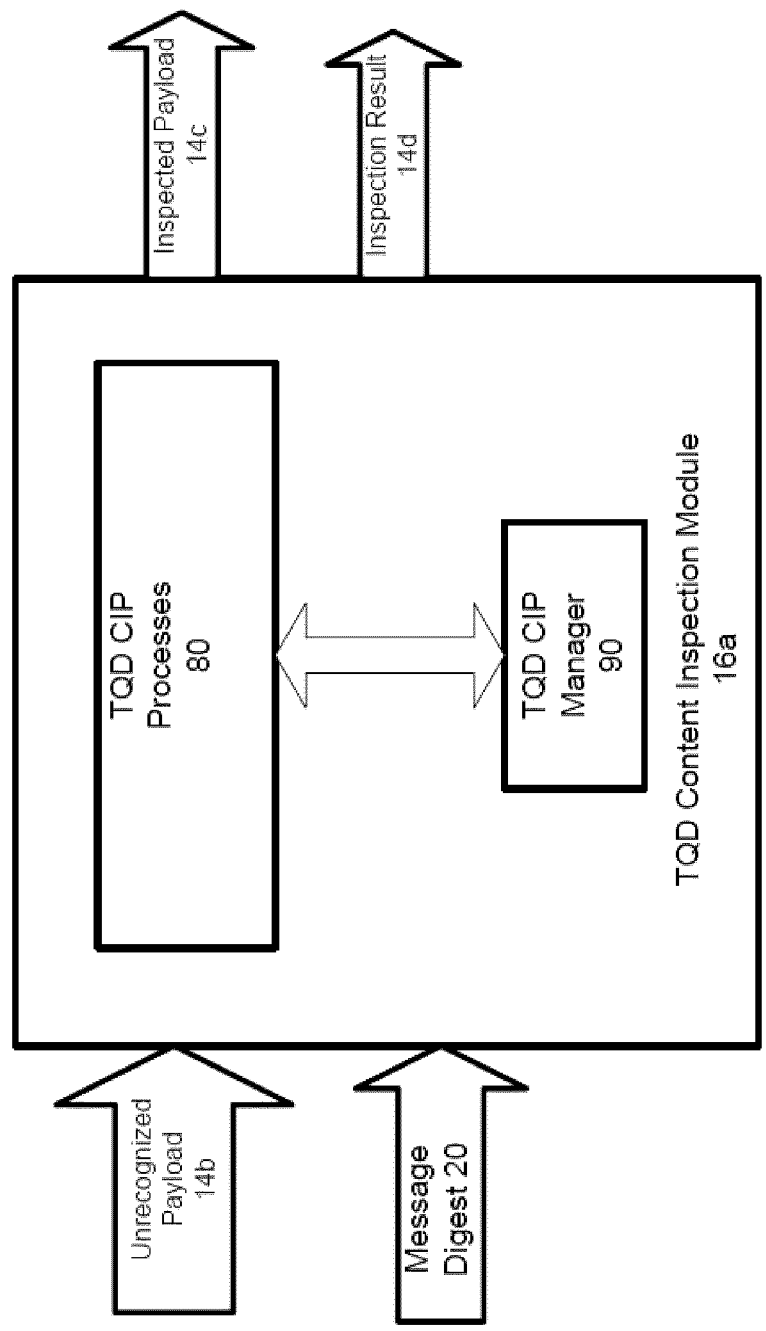
FIG. 10 is a schematic block diagram of an implementation of the content inspection module.
Figure 11:
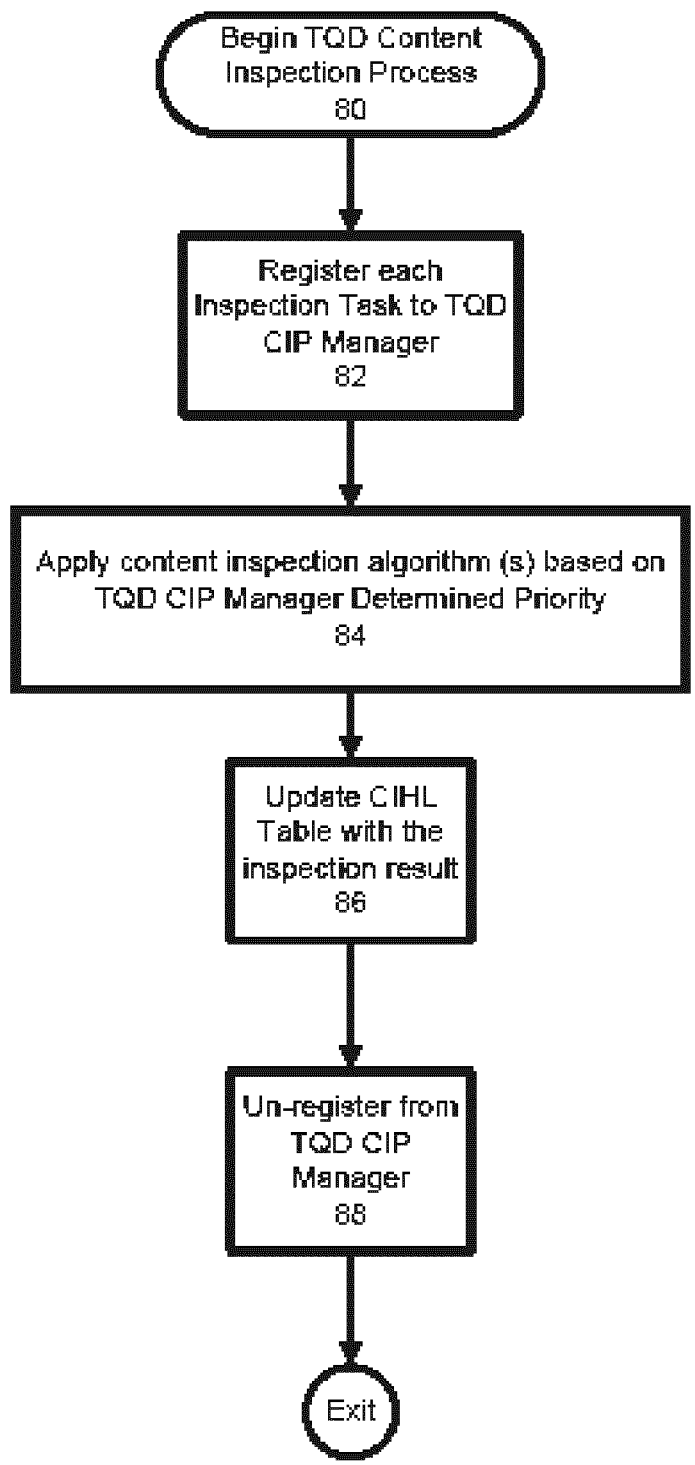
FIGS. 11 and 11A are flow diagrams of a method of using a "Time Quantum Divided" strategy to apply content inspection algorithms to a payload in accordance with one embodiment of the invention.
Figure 11A:
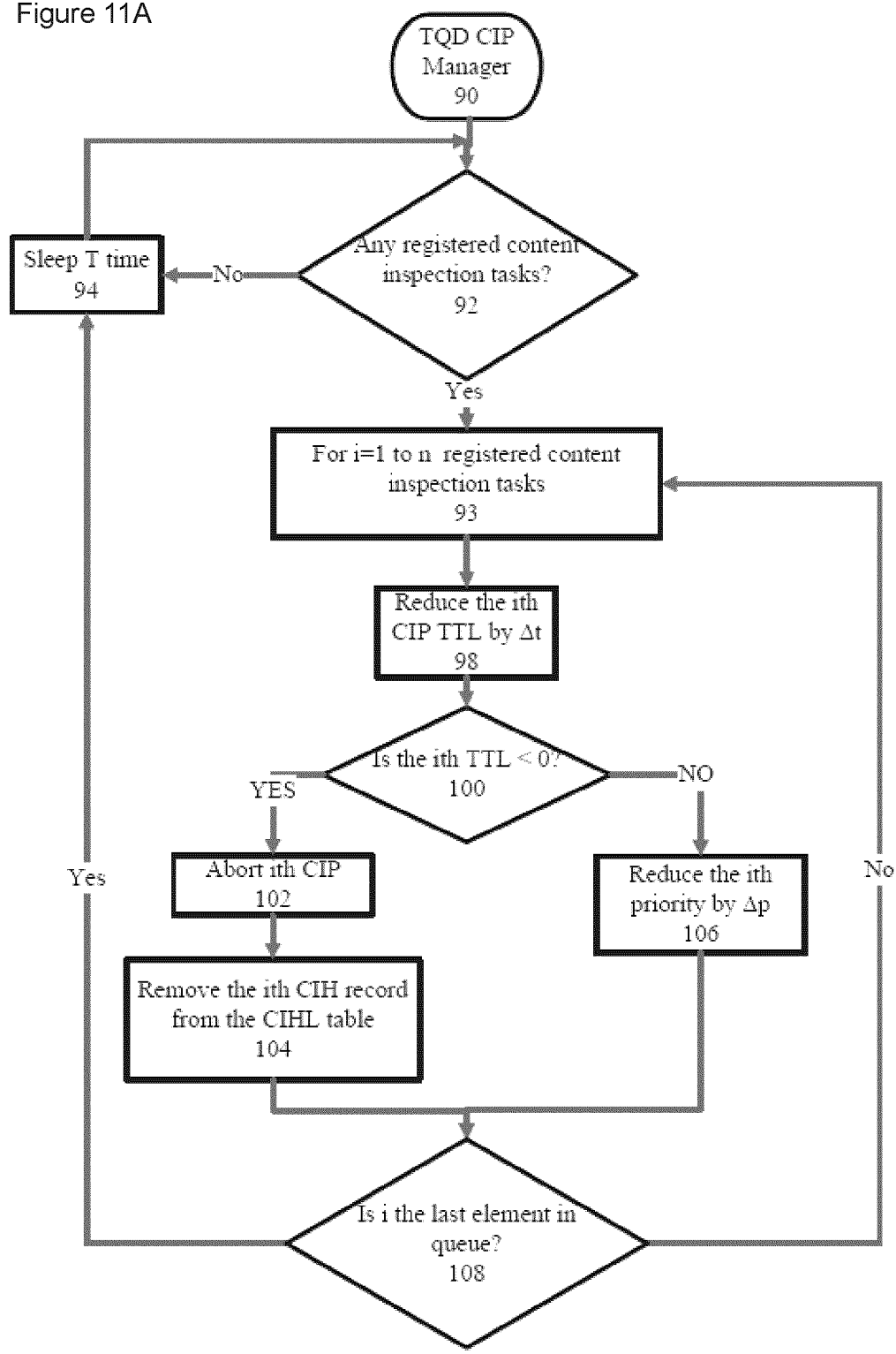

FIGS. 10, 11 and 11A describe one embodiment of the Content Inspection Module (CIM) 16a using a "Time Quantum Divided" (TQD) content inspection process scheduling strategy. This process enables the system to enhance speed of service to multiple users accessing a network by decreasing priority for a content inspection process with the passage of time. For example, in a situation where there are 100 users accessing a network, and 99 of those users are attempting to pass small payloads (e.g. a 1-2 kb file) through the network and 1 user is attempting to pass a larger file (e.g. a 100 Mb file) through the network, the scheduling manager will assign priority and allocate system resources based on both the size of each inspection task and the time taken to complete each content inspection task in order to minimize or prevent system resources being consumed by the single, larger inspection task, thus preventing each of the multiple users passing smaller payloads having to wait for the completion of the single larger inspection. That is, the system is able to prevent "live-lock" of the system resources by lengthy content inspection tasks.

As shown in FIGS. 11 and 11A, a content inspection process 80 starts by registering each content inspection task with the TQD CIP manager (FIG. 11, step 82) as each content packet requiring inspection arrives thus defining "n" inspection tasks. Upon registration, the TQD CIP manager 90 (FIG. 11A) periodically adjusts priority for each content inspection task such that each content inspection task is completed in a manner to maintain quality of service to multiple users by balancing the time to complete an inspection as determined by the number of inspection tasks, and the relative size of each inspection task. Once the inspection algorithms have been completed (step 84) based on the TQD CIP manager 90 assigned priority, the CIHL table is updated (step 86) with the inspection result and the content inspection process 80 un-registers a specific content inspect task from the TQD CIP manager (step 88).

As content inspection tasks are being registered and un-registered from the TQD CIP manager 90, the TQD CIP manager 90 continuously loops through each of the registered content inspection tasks and reviews and updates the status or priority of each content inspection task.

With reference to FIG. 11A, initially, the TQD CIP manager 90 determines if there are any registered inspection tasks (step 92). If there are no registered inspection tasks, the TQD manager 90 waits a pre-determined period of time (step 94) until re-determining if there are any inspection tasks. If there are inspection tasks (step 93), the TQD CIP manager 90 will reduce the time-to-live (TTL) value of each inspection task by a certain value (step 98). A content inspection process (CIP) will be aborted (step 102) if its TTL drops below an arbitrary threshold value (step 100). The CIH record of an aborted inspection task will be removed from the CIHL table (step 104). The transmission of the payload may be re-initiated by the sender and/or receiver at a later time.

If the TTL is not less than zero, the TQD CIP manager 90 will reduce the priority for the ith inspection task (step 106) by a pre-determined value.

Once the priority has been adjusted or the ith CIP has been aborted, the TQD CIP manager determines if there are any remaining registered inspection and either waits for a period of time (step 94) to check for registered inspection tasks or continues reviewing and adjusting the status of other registered inspection tasks.

As an example of a possible scheduling scenario, 5 content inspection tasks may have been registered with the TQD CIP manager 90. These registered inspection tasks may include 3 small files (e.g. 3 kb each), 1 medium size file (e.g. 10 Mb) and 1 large file (e.g. 100 Mb) received in any particular order. In processing these inspection tasks, the manager will seek to balance the content inspection in order to maintain efficiency for a desired level of service. For example, scheduling manager parameters may be set to ensure that priority is assigned to inspection of the smaller files first irregardless of the time of receipt. Alternatively, scheduling manager parameters may be set to ensure that priority is assigned strictly based on the time of arrival irregardless of size. As illustrated in FIG. 11A, the system may assign the same initial priority to all the inspection tasks. The scheduling manager then reduces the priority for each of the task with the passage of the time. Further still, scheduling manager parameters may be set as balance between time of arrival and size. That is, in certain situations, the large file may be processed concurrently with the smaller files based on a particular allocation of system resources. Alternatively, the large file may be processed only for a period of time, until the scheduling manager determines that processing has taken too long and the inspection process is aborted for the large file. It is understood that the number of tasks registered with the scheduling manager may be dynamically changed such that priority may be adjusted up or down based on changes to the number of registered tasks.

It is understood by those skilled in the art that the determination of priority and the allocation of system resources to effectively manage content inspection based on content size, and time-to-complete an inspection task may be accomplished by a variety of algorithms and that the methodologies described above are only a limited number of examples of such algorithms.

Classification of Inspection Results

In various embodiments, the content of a data payload, as a recognized payload 14a or an inspected payload 14c can be associated with further information as described below allowing the system to take particular actions with respect to the payload based on the inspection result (FIG. 6).

a) Classification of Content

The inspection result can be classified on the basis of content. For example, it can be a marker indicating that the content is spam, spyware or a virus.

b) Content Instructions

The inspection result can include a set of instructions to alter the content. In this case, the policy module 15 may use these instructions to take further steps with respect to the payload. For example, if the content is marked as a virus, the instructions may be to warn the recipient that the payload contains a virus and should not be opened. In other examples, the instructions may be to prevent the delivery of payload, but to send information indicating that the delivery has been denied.

c) Supplementary Data

The inspection result can be associated with supplementary data. Supplementary data provides further functionality including enhanced security to the methods of the invention.

For example, supplementary data may include the time of creation 44 of the message digest which may be used to provide enhanced security. That is, as it is known that given enough time, an attacker can achieve a collision with the commonly used one-way hash algorithms, by adding time information as supplementary data, a message digest can be retired if the message digest is older than a pre-determined value.

In another embodiment supplementary data may also or alternatively include the size 45 of the payload wherein the size information can be used to provide finer granularity to also reduce the possibility of a hash code collision. In this example, when conducting the CIHL table search function within the lookup table, both the message digest and the size have to match those of the payload.

Deployment

The system may be deployed as an adaptive external module of an existing content inspection system, or as an embedded module within a content inspection system.

Figure 12:
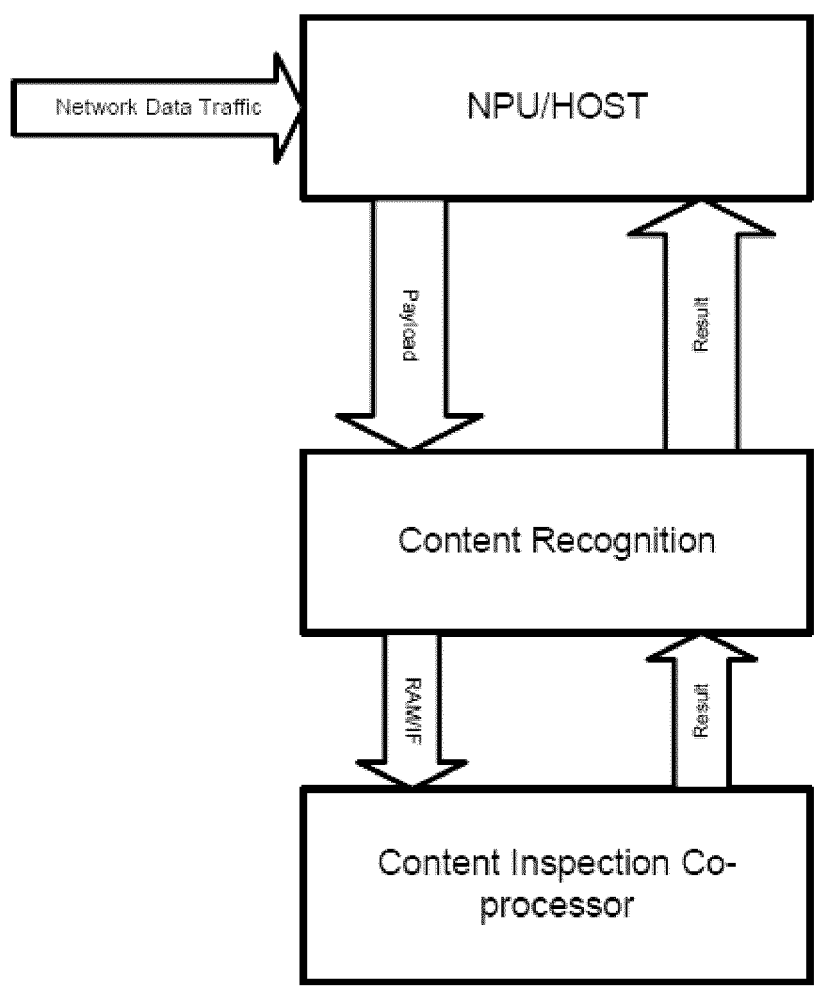
FIG. 12 is a schematic block diagram of the implementation of the system of the invention using a content co-processor in accordance with one embodiment of the invention; and, FIG. 13 is a schematic block diagram of a network showing how multiple servers on a network may learn from the content inspection performed by other servers.

In one embodiment, the system is implemented with the content recognition module interacting with an existing content inspection co-processor as shown in FIG. 12.

In another embodiment, the system is a software component embedded into a content inspection module which is a software module, a co-processor or a computer system.

Figure 13:
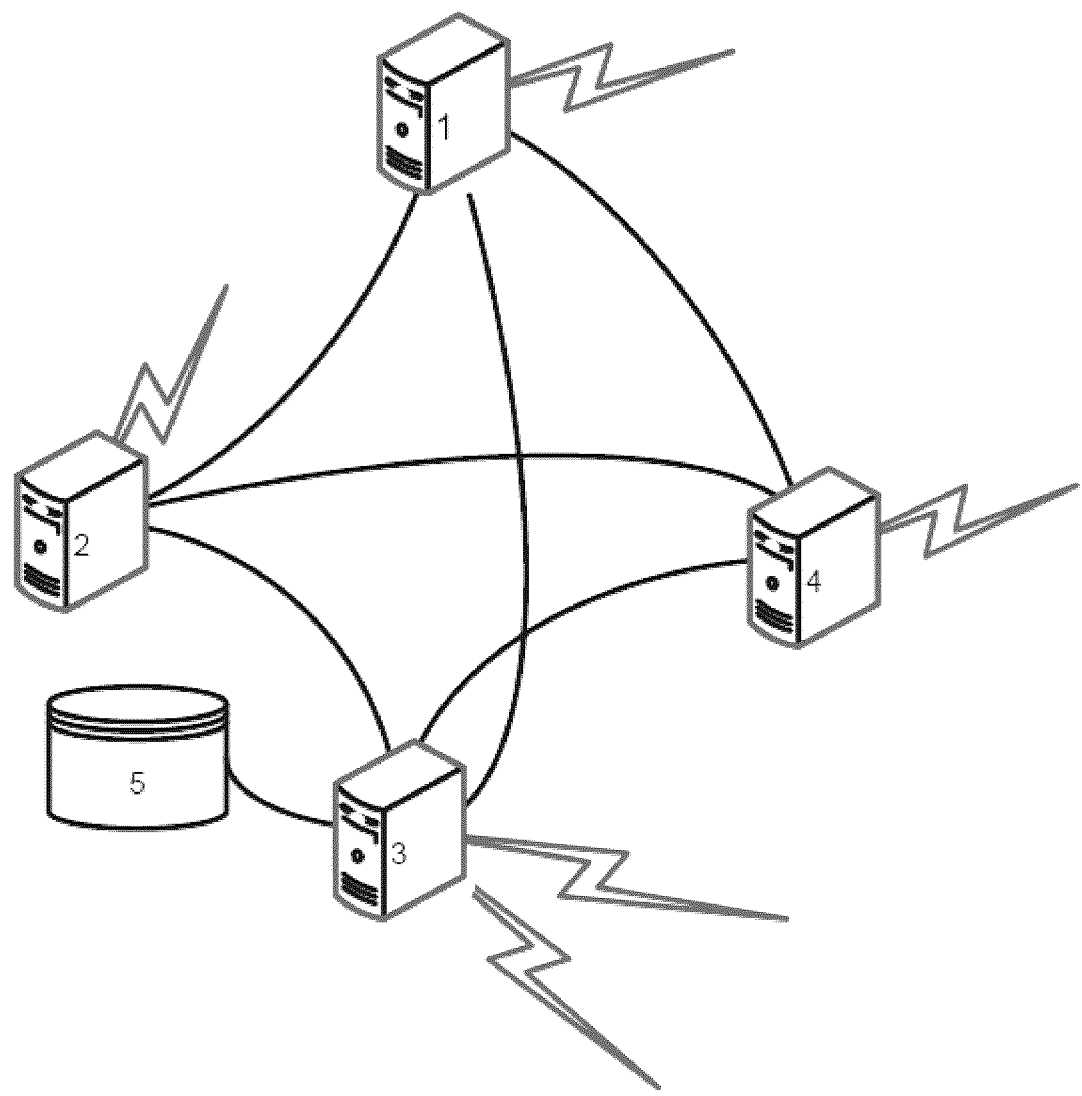

In a further embodiment, and in order to leverage the computation spent on content inspection, the message digests along with the inspection results can be shared among several instances of content recognition/inspection systems as shown in FIG. 13. The sharing can be accomplished by storing the message digests along with the inspection results in a central server shared by these instances of content recognition/inspection systems, or replicating the digests along with the inspection results in each instances of the group. For example, FIG. 13 shows four networked servers that each have external Internet connections that are securely linked via a common internal network. Server 3 is shown to represent the highest traffic server, possibly as an enterprise gateway. Servers 1, 2 and 4 see less traffic but are operatively and securely connected to Server 3. A NBCI database is connected to Server 3. In order to further enhance the efficiency of the system, each server may report the results of their respective payload inspections to Server 3 and hence to database 5 such that each server on the system can "learn" from the experiences of the other Servers, thereby preventing the duplication of content inspection across a larger network. This networked embodiment is particularly beneficial in larger enterprises or service providers where the volume of traffic is sufficiently large that the ability to share such inspection results can greatly enhance the overall efficiency and cost-effectiveness of the system.

The preceding description is intended to provide an illustrative description of the invention. It is understood that variations in the examples of deployment of the invention may be realized without departing from the spirit of the invention.

CONCLUSIONS

As outlined above, the present technology may be better able to reach a verdict using signature and AI-based scanning in real time (i.e. at line rates). This may be at least partially because of the subsonic scanning (and hashing of previous caches) as well as the Time Quantum based scheduling described in the applicant's previous U.S. Pat. No. 7,630,379. These techniques may be used in both the signature and the AI based scanners.

Another aspect of the present application may be used inline with traffic. The reason most previous network solutions typically use tap mode is because they cannot 'cope' with the network throughput, and hence being in tap mode means they can pass on some network traffic, without slowing the network. However, disadvantages of such tap mode (not inline) solutions may include that they cannot participate in the handshakes of 'encryption' (SSL for example) and hence cannot 'see' encrypted content. With encryption becoming more the norm, increasing at nearly 16% year over year (nearly 64% now), the usefulness of tap mode solution may be diminished.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. An apparatus for network-based, malware analysis comprising:
a processor; and
a memory configured to store computer program code;
wherein the processor, memory, and computer program code are configured for in-line inspection of network-based content and to provide:
a signature scanner configured to scan at network line-rates incoming network-based content with signature-based scanning which comprises comparing a signature of the incoming network-based content with previously identified signatures to identify if the incoming network-based content is a known threat content;
an Artificial Intelligent (AI) scanner configured to scan at network-line rates and previously trained and configured to:
read the code of the network-based content which has not been identified as a known threat in the signature-based scanning step without executing the code;
use machine learned characteristics of malicious code to assign a risk value to the network-based content based on the read code of the network-based content;
identify network-based content having been assigned a risk score below a safe threshold value as safe content;
identify network-based content having been assigned a risk score above a threat threshold value as threat content; and
identify network-based content having been assigned a risk score above the safe threshold value and below the threat threshold value as suspicious content; and
a controller configured, based on the scans:
to allow safe content; and
to block threat content; and
a behavioural scanner configured to run suspicious content in an isolated virtual environment to determine whether the suspicious content contains threat content or safe content;
wherein the controller is configured to notify a user of identified suspicious content and prompt the user for input regarding how to process the identified suspicious content.

2. The apparatus according to claim 1, the network-based content includes Multipurpose Internet Mail Extension (MIME) objects.

3. The apparatus according to claim 1, the network-based content includes one or more attachments.

4. The apparatus according to claim 1, wherein the AI scanner is configured to scan the content in parallel.

5. The apparatus according to claim 1, wherein the controller is configured to:
receive information from other users of the apparatus regarding how to process suspicious content; and
provide this information to the user to allow the user to base their input on information received from other users.

6. The apparatus according to claim 1, wherein the content is processed through the signature and AI scanners at a rate of at least 1 Gbps.

7. The apparatus according to claim 1, wherein the apparatus is configured to identify different types of malware identified as threat content.

8. The apparatus according to claim 2, the network-based content includes one or more attachments.

9. The apparatus according to claim 1, wherein suspicious content from the behavioural scanner is passed to a machine learning algorithm as identified content and is identified to the AI scanner as either comprising malware or as not comprising malware;
wherein the AI scanner is configured to scan the identified content to refine the characteristics which it uses to identify content as a threat based on the identified content received.

10. The apparatus according to claim 1, wherein the AI scanner is configured to prioritize scanning unidentified content which has not been identified as being blocked or allowed over identified content which has already been identified as being blocked or allowed.

11. The apparatus according to claim 1, wherein the apparatus is configured to assign priority and allocate apparatus resources based on both the size of each inspection task and the time taken to complete each content inspection task.

12. The apparatus according to claim 1 wherein the network-line rates are between 100 Mbits/s and 1 Gbits/s.

13. The apparatus according to claim 1 wherein the network-line rates are between 1 Gbits/s and 10 Gbits/s.

14. The apparatus according to claim 1 wherein the network-line rates are over 100 Gbits/s.

* * * * *